(12) United States Patent
Roberts, Jr.

(10) Patent No.: US 9,512,871 B2
(45) Date of Patent: Dec. 6, 2016

(54) VARIABLE AREA JOURNAL BEARING

(71) Applicant: Southwest Research Institute, San Antonio, TX (US)

(72) Inventor: Charles E. Roberts, Jr., Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 413 days.

(21) Appl. No.: 14/290,488

(22) Filed: May 29, 2014

(65) Prior Publication Data

US 2015/0345542 A1    Dec. 3, 2015

(51) Int. Cl.
| | |
|---|---|
| *F16C 9/02* | (2006.01) |
| *F16C 43/02* | (2006.01) |
| *F02F 7/00* | (2006.01) |
| *F16C 17/02* | (2006.01) |

(52) U.S. Cl.
CPC ............ *F16C 9/02* (2013.01); *F16C 17/022* (2013.01); *F16C 17/028* (2013.01); *F16C 43/02* (2013.01); *Y10T 29/49641* (2015.01)

(58) Field of Classification Search
CPC ........ F16C 9/02; F16C 17/022; F16C 17/028; F16C 43/02; F16C 32/0629; F16C 32/067; F16C 32/064; F16C 39/04; F02F 7/0053
USPC ............. 123/197.4; 384/100, 101, 107, 114; 29/898.08, 898.09, 898.02
See application file for complete search history.

(56) References Cited

U.S. PATENT DOCUMENTS

| | | | |
|---|---|---|---|
| 3,449,028 A * | 6/1969 | De Hart | F16C 33/1065 384/120 |
| 3,708,215 A | 1/1973 | Wilcock et al. | |
| 4,175,799 A | 11/1979 | Davis et al. | |
| 4,243,274 A | 1/1981 | Greene | |
| 4,268,094 A | 5/1981 | Greene | |
| 4,747,705 A * | 5/1988 | Agrawal | F16C 17/028 384/118 |
| 5,455,778 A | 10/1995 | Ide et al. | |
| 5,459,674 A | 10/1995 | Ide et al. | |
| 5,513,917 A | 5/1996 | Ide et al. | |
| 5,743,654 A | 4/1998 | Ide et al. | |
| 6,460,635 B1 | 10/2002 | Kalsi et al. | |

(Continued)

FOREIGN PATENT DOCUMENTS

WO    94/00819    1/1994

OTHER PUBLICATIONS

U.S. Office Action, mail date Feb. 10, 2015, issued in related U.S. Appl. No. 13/661,931 (10 pgs).
U.S. Office Action, mail date Jul. 18, 2014, issued in related U.S. Appl. No. 13/184,097 (7 pgs).

*Primary Examiner* — Grant Moubry
(74) *Attorney, Agent, or Firm* — Grossman, Tucker et al (57) ABSTRACT

A method of adjusting a load-bearing capacity of a hydrodynamic plain journal bearing for a journal is provided comprising providing a hydrodynamic plain journal bearing having a circumference, wherein a load-bearing capacity of the journal bearing varies around the bearing circumference; providing the hydrodynamic plain journal bearing in a journal bearing support structure, wherein the support structure supports the hydrodynamic plain journal bearing around the journal; and rotating the hydrodynamic plain journal bearing within the support structure to change a position of the load-bearing capacity of the journal bearing relative to the journal.

20 Claims, 8 Drawing Sheets

(56) References Cited

U.S. PATENT DOCUMENTS

| | | |
|---|---|---|
| 6,502,989 B1 | 1/2003 | Takeuchi et al. |
| 6,766,697 B1 | 7/2004 | Perez et al. |
| 8,955,224 B2 | 2/2015 | Roberts, Jr. |
| 2006/0251859 A1 | 11/2006 | D'Urso |
| 2007/0245563 A1 | 10/2007 | Smith |
| 2011/0303183 A1* | 12/2011 | Zottin .................. F16C 9/04 123/197.3 |
| 2013/0016931 A1 | 1/2013 | Roberts, Jr. |
| 2013/0114919 A1 | 5/2013 | Roberts, Jr. |
| 2014/0026843 A1 | 1/2014 | Florea et al. |

* cited by examiner

VARIABLE AREA JOURNAL BEARING

FIELD

The present disclosure relates to a journal bearing, and more particularly a hydrodynamic plain journal bearing which may be used in conjunction with a rotating journal, such as a crankshaft of an internal combustion engine or a drive shaft of an electric motor.

BACKGROUND

Hydrodynamic (fluid film) journal bearings of engines and motors are designed to provide uniform hydrodynamic load-bearing capacity around the circumference of the journal bearing. More particularly, to provide such uniform hydrodynamic load-bearing capacity, the fluid wetted, load-bearing surface area of the journal bearing is designed to be constant around the circumference of the journal bearing.

Loads applied to journal bearings by a journal may often vary around a circumference of the journal bearing, such as the loads provided by the cyclic operation of an internal combustion engine. As a result, a journal bearing which provides uniform hydrodynamic load-bearing capacity around its circumference may be understood to be designed to accommodate the greatest (maximum) load to be experienced by the bearing during rotation of the journal, i.e. a worst case scenario.

As such, in providing a uniform hydrodynamic load-bearing capacity around the circumference of the journal bearing, the journal bearing may be understood to be overdesigned at those locations which are not exposed to the greatest applied loads of the journal. As a result, in those areas of such overdesign, the journal bearing is not optimized with regards to drag and resulting fuel efficiency of the engine.

The present disclosure provides journal bearings and methods of use thereof wherein the journal bearings are designed with a hydrodynamic load-bearing capacity which varies in accordance with the journal loads applied to journal bearing such that energy (power) and fuel economy losses due to drag may be decreased.

SUMMARY

The present disclosure recognizes that the effective surface area of a hydrodynamic (fluid film) journal bearing (i.e. the interface of the sliding surfaces of the journal bearing and the journal) may be varied and adjusted to better match the instantaneous load of a journal, such that viscous drag forces may be reduced, and more particularly minimized, such that operating efficiency may be increased.

Particularly for cyclically-loaded journal bearings, the surface area of the journal bearing presented to the journal load may be varied and adjusted to provide a more optimized surface area for varying load conditions encountered by the journal bearing. The result of matching the instantaneous effective bearing surface area of the journal bearing to the instantaneous load requirement of the journal may be understood to reduce and more particularly minimize frictional losses of the journal bearing, providing the most energy efficient load-bearing capacity. The educed viscous friction losses will improve the energy efficiency of machinery that utilizes this new bearing technology.

According to one exemplary embodiment of the present disclosure, a method of adjusting a load-bearing capacity of a hydrodynamic plain journal bearing for a journal, is provided, with the method comprising: providing a hydrodynamic plain journal bearing having a circumference, wherein a load-bearing capacity of the journal bearing varies around the bearing circumference; providing the hydrodynamic plain journal bearing in a journal bearing support structure, wherein the support structure supports the hydrodynamic plain journal bearing around the journal; and rotating the hydrodynamic plain journal bearing within the support structure to change a position of the load-bearing capacity of the journal bearing relative to the journal.

In at least one embodiment, the hydrodynamic plain journal bearing comprises a bearing inner lining, wherein the bearing inner lining has an effective width (and corresponding area) which varies around a portion of the bearing circumference such that the load-bearing capacity of the journal bearing varies around the bearing circumference.

In at least one embodiment, the bearing inner lining includes an aperture shaped and arranged such that the effective width (and corresponding area) of the bearing inner lining varies around the portion of the bearing circumference.

In at least one embodiment, an imaginary plane may bisect the width of the bearing inner lining into two equal halves; and the aperture is symmetrical on each side of the plane. In such regard, the load-bearing capacity of the journal bearing on each half of the bearing may be equal.

In at least one embodiment, the aperture may have a width and a length, wherein the length is defined by opposing ends of the aperture; the length of the aperture extends around the circumference of the bearing inner lining perpendicular to a longitudinal axis of the journal bearing; and the width of the aperture varies continuously along the length of the aperture from one end to the other end.

In at least one embodiment, the aperture may have a width and a length, wherein the length is defined by opposing ends of the aperture; the length of the aperture extends around the circumference of the journal bearing inner lining perpendicular to a longitudinal axis of the journal bearing; and the width of the aperture increases continuously along the length of the aperture from one end to the other end.

In at least one embodiment, the journal bearing and journal may be in an internal combustion engine or electric motor; and the width of the aperture may increase in a rotation direction of the journal during operation of the engine or the electric motor.

In at least one embodiment, the aperture may have a width and a length, wherein the length is defined by opposing ends of the aperture; the length of the aperture extends around the circumference of the journal bearing inner lining perpendicular to a longitudinal axis of the journal bearing; and the width of the aperture increases continuously at a constant rate along the length of the aperture from one end to the other end.

In at least one embodiment, the aperture may have a shape of a triangle, such as an isosceles triangle. The journal bearing inner lining may be separable into two halves, and have an outer width which remains constant around the bearing circumference.

In at least one embodiment, the journal bearing and journal may be an internal combustion engine or an electric motor; and rotating the hydrodynamic plain journal bearing within the support structure to change a position of the load-bearing capacity of the journal bearing relative to the journal may further comprise rotating the hydrodynamic plain journal bearing within the support structure as a load on the engine or motor changes.

In at least one embodiment, the journal bearing and journal may be an internal combustion engine or an electric motor; and rotating the hydrodynamic plain journal bearing within the support structure to change a position of the load-bearing capacity of the journal bearing relative to the journal further comprises rotating the hydrodynamic plain journal bearing within the support structure as a load on the engine or motor changes and the journal moves closer to the journal bearing.

In at least one embodiment, the journal bearing and journal may be an internal combustion engine or an electric motor; and rotating the hydrodynamic plain journal bearing within the support structure to change a position of the load-bearing capacity of the journal bearing relative to the journal further comprises rotating the hydrodynamic plain journal bearing within the support structure in a first direction as a load on the engine or motor increases and rotating the hydrodynamic plain journal bearing within the support structure in a second direction oppose the first direction as the load on the engine or motor decreases.

In at least one embodiment, the journal bearing and journal may be an internal combustion engine or an electric motor; and rotating the hydrodynamic plain journal bearing within the support structure to change a position of the load-bearing capacity of the journal bearing relative to the journal further comprises rotating the hydrodynamic plain journal bearing within the support structure as a load on the engine or motor increases and the journal moves closer to a location of the journal bearing such that the load-bearing capacity of the journal bearing increases at the location where the journal moves closer to the journal bearing to inhibit contact of journal bearing by the journal.

In at least one embodiment, the journal bearing and journal may be an internal combustion engine; and rotating the hydrodynamic plain journal bearing within the support structure to change a position of the load-bearing capacity of the journal bearing relative to the journal further comprises rotating the hydrodynamic plain journal bearing within the support structure during a power stroke and/or exhaust stroke of the engine.

In at least one embodiment, the journal bearing and journal are in an internal combustion engine having a four-stroke cycle; and rotating the hydrodynamic plain journal bearing within the support structure to change a position of the load-bearing capacity of the journal bearing relative to the journal further comprises rotating the hydrodynamic plain journal bearing within the support structure only during a portion of the four-stroke cycle.

In at least one embodiment, rotating the hydrodynamic plain journal bearing may be performed by an actuator, and the actuator may be mounted to the journal bearing support structure. An engine controller may be programmed to control the actuator.

In another embodiment, an engine may be provided comprising: an internal combustion engine having a plurality of reciprocating pistons within an engine block, each piston having linear movement convertable to rotating movement via a connecting rod connecting each piston to a crankshaft; the crankshaft rotatable about a linear axis, the crankshaft having a plurality of main journals and a plurality of main journal bearings, each main journal rotatable on a main journal bearing; and wherein each of the main journal bearings comprises a hydrodynamic plain journal bearing which rotates within a support structure of the engine to change a position of the load-bearing capacity of the bearing relative to the journal

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting.

Many journal bearing applications result in the journal bearing undergoing a range of loads, with the load applied to the journal bearing by the journal varying at different locations around the circumference of the bearing. For example, a crankshaft of an internal combustion engine may be understood to apply variable loads to the supporting main journal bearings, as well as the connecting rod journal bearings, due to the reciprocating motion of the pistons, as well as the varying combustion pressures exhibited during cyclic operation of the engine. As such, given the variation in load applied to each journal bearing, the load-bearing surface area A of each journal bearing is designed to accommodate the greatest instantaneous load to be applied to each journal bearing by the journal.

The viscous drag between two sliding surfaces may be generally stated by the equation Drag Force=$A \vartheta$ dV/dy, where the drag force (DF) is proportional to the load-bearing surface area (A), the lubricating fluid (oil) viscosity ($\vartheta$), and the spatial rate of change of the velocity of the fluid (dV) and the clearance gap (dy). The bearing surface area (A) may be understood as the surface area of the bearing which is coated with the lubricating fluid which is in contact with the journal. The load-bearing capacity of the bearing, particularly its ability to maintain a minimum oil-film thickness or, restated, its ability to provide hydrodynamically lubricated bearing operation without surface-to-surface bearing contact, is also a function of the bearing load-bearing surface area (A).

As journal bearings are typically circular, providing a load-bearing surface for a rotating journal, the foregoing description may be understood to generally describe the behavior of a journal bearing at specific differential circumferential positions around the bearing, where the differential area, velocity gradient, and viscosity may be considered constant. As such, the total drag force of the journal bearing may be understood as the integration of the differential drag forces exhibited around the circumference of the journal bearing.

Given that the load-bearing surface area (A) of the journal bearing is designed to accommodate the greatest instantaneous load to be applied to the journal bearing by the journal, the journal bearing is effectively over-designed for operating conditions where the load-bearing capacity of the journal bearing is greater than the current instantaneous load. Additionally, the viscous drag of the journal bearing is proportional to the bearing area. Consequently, at operating conditions where the journal bearing's load-bearing capacity is greater than the instantaneous bearing load, the viscous drag of the journal bearing is higher than that which would occur for a journal bearing with the optimum instantaneous surface area. The present disclosure addresses this problem.

Figure 1:
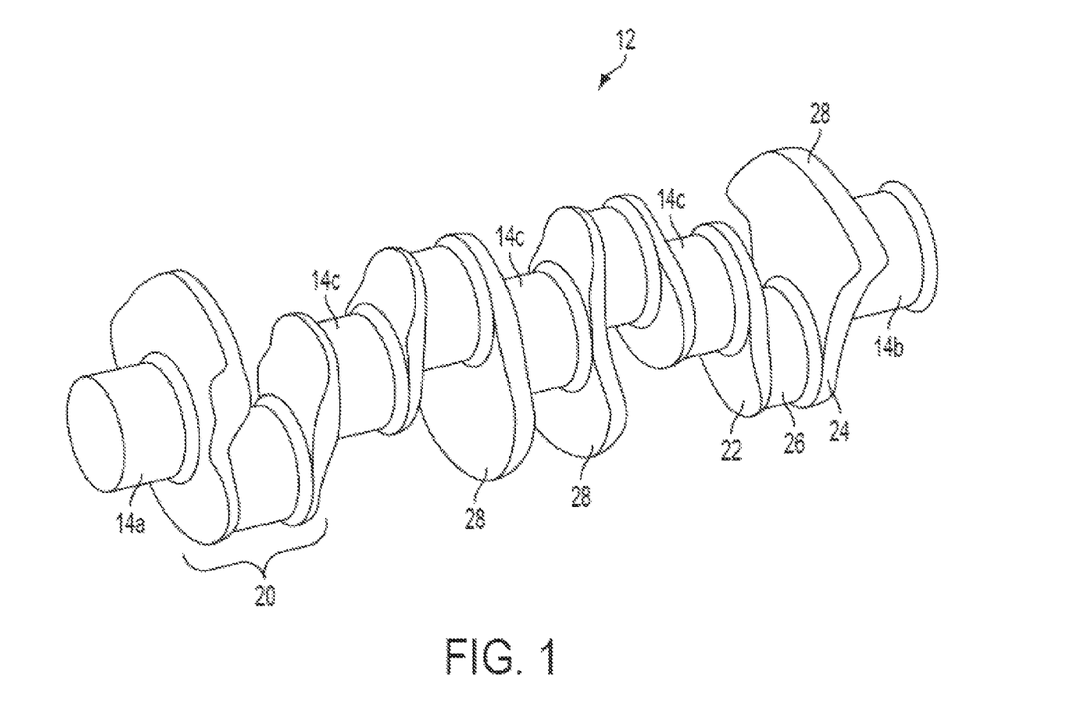
FIG. 1 is an isometric view of an exemplary crankshaft for a four-stroke reciprocating internal combustion engine.
Figure 2:
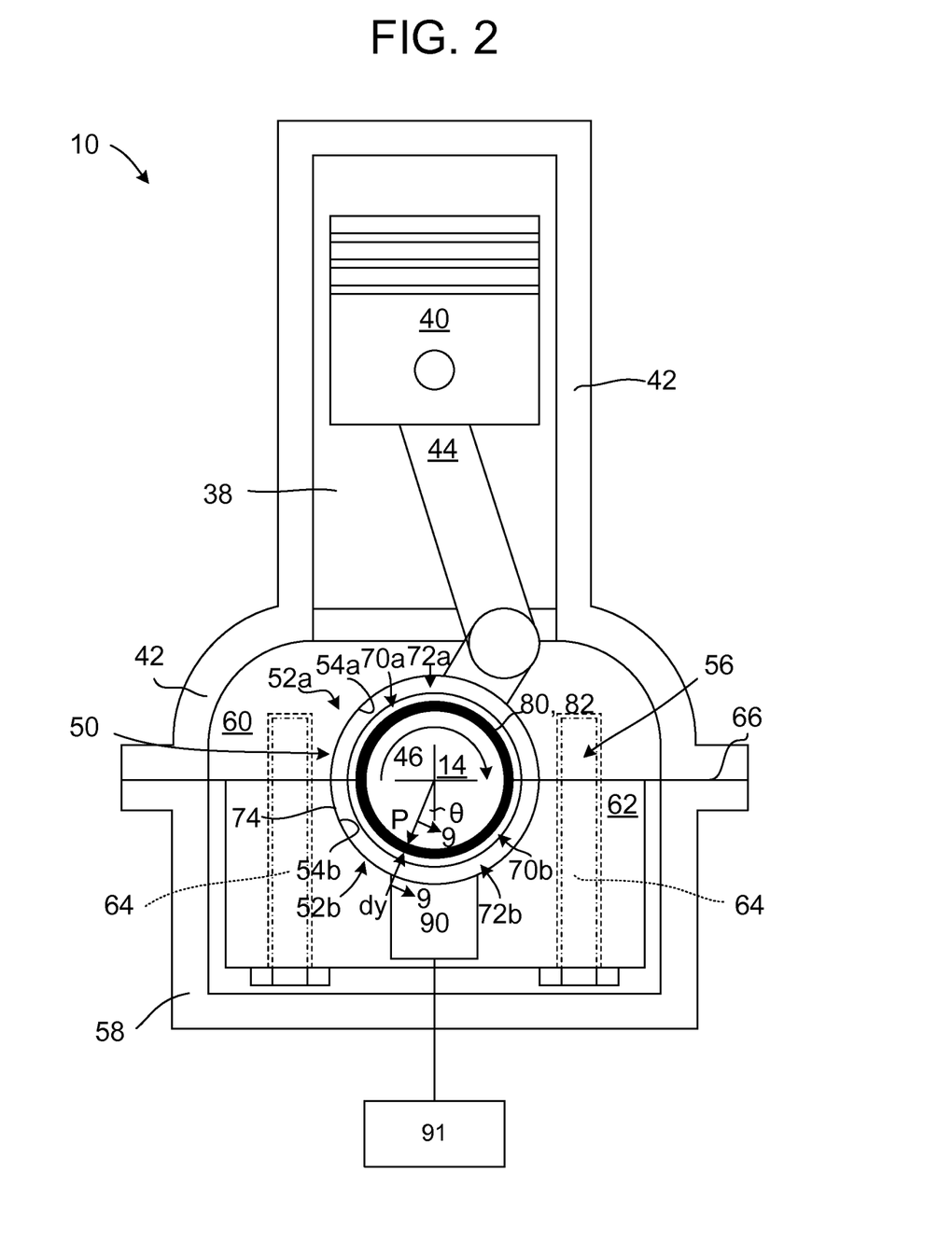
FIG. 2 shows a cross-sectional side view of an internal combustion engine, including the crankshaft of FIG. 1 supported by a main journal bearing of the present disclosure, with the piston in the combustion stroke, and the engine under a low load condition.

Referring now to the figures, there is shown an exemplary crankshaft 12 in FIG. 1, particularly for a four-stroke reciprocating internal combustion engine 10 as shown in FIG. 2. Crankshaft 12 may be understood to comprise a plurality of journals 14 comprising a front main journal 14a, a rear main journal 14b and a plurality of intermediate main journals 14c therebetween. Among other things, the main journals 14 serve as support locations for the crankshaft 12. As shown, each of the main journals 14 are located between and separated by a crank 20.

Each crank 20 of the crankshaft 12 comprises two crank arms 22 and 24 separated by a connecting rod journal 26. Each connecting rod journal 26 of each crank 20 is offset from the main journals 14, and provides a location of attachment for a connecting rod 44. The distance of the offset between the connecting rod journal 26 and the main journals 14 may be referred to as the crank-throw. On some crankshafts, part of the crank arms 22, 24 of the crankshaft 12 extends beyond the main journals 14 to form counterweights 28.

As shown in FIG. 2, internal combustion engine 10 comprises a plurality of reciprocating pistons 40 within a cylinder or engine block 42 (one piston shown, others similar). Each piston 40 has linear movement convertable to rotating movement via a connecting rod 44 connecting each piston 40 to crankshaft 12, which is rotated as indicated by arrow 46 about a linear axis of the crankshaft.

Each main journal 14 of the crankshaft 12 rotates within a plain main journal bearing 50 which surrounds the main journal 14 of the crankshaft 12, and which may more particularly be characterized as a hydrodynamic (fluid film) plain journal bearing. A hydrodynamic plain journal bearing may be understood as a bearing which does not including rolling elements (e.g. ball or rollers), but rather is a bearing which is operated with hydrodynamic lubrication, in which the bearing surface is separated from the journal surface by a lubricant film generated by the rotational motion of the journal 14.

More particularly, hydrodynamic plain journal bearing 50 operates in conjunction with a lubricant, here the engine oil, to provide the lubricant film. Hydrodynamic lubrication is achieved when crankshaft 12 rotates quickly enough for lubrication to flow around the journal bearing 50 and cover its surface. Hydrodynamic lubrication may also be called full-fluid lubrication.

Main journal bearing 50 comprises two semi-circular bearing halves 52a and 52b, which form a cylindrical sleeve which surrounds main journal 14. One bearing half 52a is located in a semi-circular opening 54a formed in the engine block 42 (in the cross-connecting walls 60 forming the bulkhead of the engine block 42), and the other bearing half 52b is located in a semi-circular opening 54b formed in a main journal bearing cap 62 which connects to the engine block 42 by threaded fasteners 64. In this manner, the engine block 42 and the main journal bearing cap 62 provide a journal bearing support structure 56 which supports the plain journal bearing 50 around the journal 14. In other embodiments, main journal bearing cap 62 may be an integral part of crankcase cover 58, which closes the lower portion of the crankcase.

Each bearing cap 62 includes an actuator 90 which is coupled (e.g. mechanically, hydraulically and/or electrically) to the journal bearing 50, and more particularly to bearing half 52b, such that the journal bearing 50 may be rotated along its outer circumference 74 within the circular opening 54 formed by semi-circular openings 54a and 54b. For example, actuator 90 may comprise a two direction rotary solenoid which includes a gear wheel which rotates on an armature, with the gear wheel including gear teeth which engage with teeth formed on the backside of bearing half 52b. Actuator 90 may be controlled by an engine controller 91.

In such manner, journal bearing 50 may be rotated relative to the journal bearing support structure 56 and the journal 14 in either a clockwise or counter-clockwise direction. As explained in greater detail below, rotating the journal bearing 50 such may be performed to change a position of the load-bearing capacity of the journal bearing 50 relative to the journal 14, particularly to adjust the load-bearing capacity of the journal bearing 50 relative to the journal 14.

Journal bearing semi-circular half 52a comprises a bearing inner lining 70a and a bearing outer shell support 72a. Similarly, journal bearing semi-circular half 52b comprises a bearing inner lining 70b and a bearing outer shell support 72b. The bearing outer shell supports 72a, 72b comprise a harder material than the bearing inner linings 70a, 70b.

Exemplary materials for the bearing inner linings 70a, 70b of journal bearing halves 52a, 52b include babbitt (tin-copper; tin-antimony-copper; lead-antimony-tin; copper-lead; lead-tin; copper-tin-lead), copper-lead and aluminum. The inner linings have a thickness generally in a range of 0.25 mm to 0.50 mm. Exemplary materials for the bearing outer shell supports 72a, 72b include non-magnetic metals, ceramics and polymers including fiber-glass reinforced composites which may have a thickness generally in a range of 2 mm to 4 mm.

As shown in FIG. 2, an annular main bearing-to-journal clearance 80 is provided between main journal 14 and bearing inner linings 70a, 70b of journal bearing halves 52a, 52b, respectively, for the lubricant 82. The main bearing-to-journal clearance 80 may be generally in a range from 0.025 mm to 0.060 mm depending on the internal combustion engine 10.

Thus, for engine 10, the lubricating system in the internal combustion engine 10 continuously supplies the lubricant 82 (engine oil) to each journal bearing 50 such that each main journals 14 of the crankshaft 12 actually roll on a film of the lubricant 82 contained in the annular clearance 80.

As shown in FIG. 2, when engine 10 is operated at a low load, the main bearing-to-journal clearance 80 is substantially uniform around the circumference of main journal 14, with the journal 14 being substantially concentric to the bearing position. However, as explained in greater detail below, when engine 10 is operated as higher loads, the uniformity of the annular clearance 80 is subject to change, particularly as the loaded journal displaces from the concentric position and forms a converging gap between the surface of the journal bearing 50 and the main journal 14.

As set forth above, crankshaft 12 of internal combustion engine 10 may be understood to apply cyclic (variable) loads to the supporting main journal bearings 50, due to the reciprocating motion of the pistons 40, as well as the varying combustion pressures exhibited during cyclic operation of the engine 10. As the in-cylinder pressure of the internal combustion engine 10 increases, high combustion loads may result in downward displacement of the crankshaft 12 and subsequent reduced thickness of the oil-film formed between one or more of the main journals 14 and the journal bearings 50 as the main journals 14 moves towards the supporting journal bearings 52.

Depending on fuel injection timing and ignition timing, maximum combustion pressure/force within the cylinder 38 containing piston 40, and the ensuing maximum downward pressure/force of the piston 40 and the crankshaft 12, ordinarily occurs during the combustion stroke, such as within the first 90 degrees (in the range of zero (0) to 90 degrees) of the combustion stroke of engine 10.

In FIG. 2, piston 40 is shown to be in the combustion stroke, approximately 10-15 degrees after top dead center (ATDC) position. Similarly, in FIG. 3, piston 40 is at the same location of the combustion stroke as FIG. 2, i.e. approximately 10-15 degrees after top dead center (ATDC) position. However, in contrast to FIG. 2, in FIG. 3 internal combustion engine 10 is being operated under a medium load condition.

Figure 3:
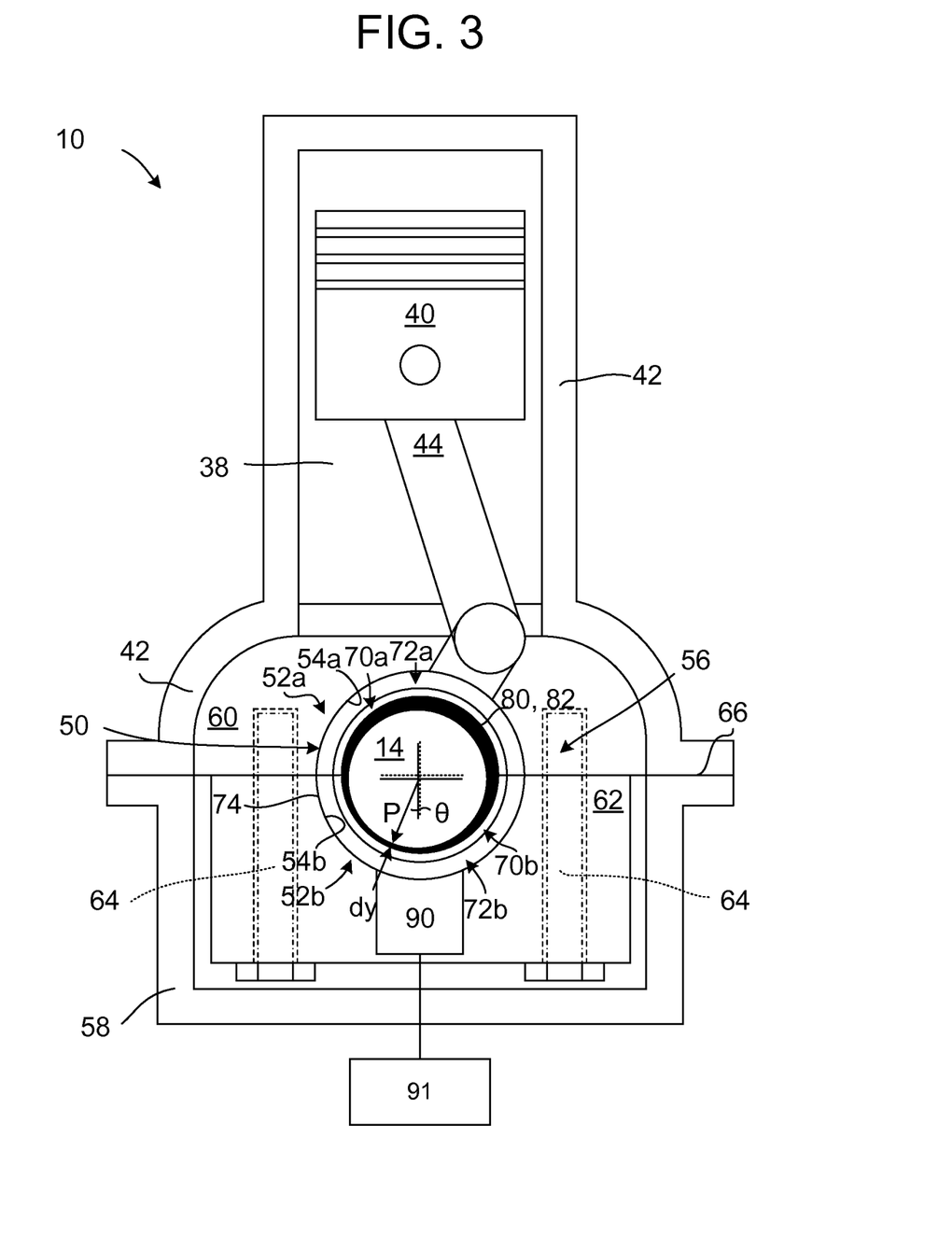
FIG. 3 shows a cross-sectional side view of the internal combustion engine of FIG. 2 with the piston in the combustion stroke, and the engine under a medium load condition.

As shown in FIG. 3, the journal 14 is no longer rotating concentric with the center axis of the journal bearing 50, but now is rotating in an eccentric manner around the center axis of the journal bearing 50. As a result, the main bearing-to-journal clearance 80 at high oil pressure location P, i.e. shown as the distance dy between journal 14 and bearing inner lining 70b at reference angle θ, has now decreased as compared to the low load condition as shown in FIG. 2.

Referring now to FIG. 4, piston 40 again is shown in the same location as FIGS. 2 and 3, i.e. approximately 10-15 degrees after top dead center (ATDC) position, albeit with the internal combustion engine 10 now being operated under a high load condition. Similar to FIG. 3, the journal 14 no longer is rotating concentric with the center axis of the journal bearing 50, but now is rotating in an even greater eccentric manner around the center axis of the journal bearing 50. As a result, the main bearing-to-journal clearance 80 at high oil pressure location P, i.e. shown as the distance dy between journal 14 and bearing inner lining 70b at reference angle θ, has now decreased as compared to the medium load condition as shown in FIG. 3.

Figure 5:
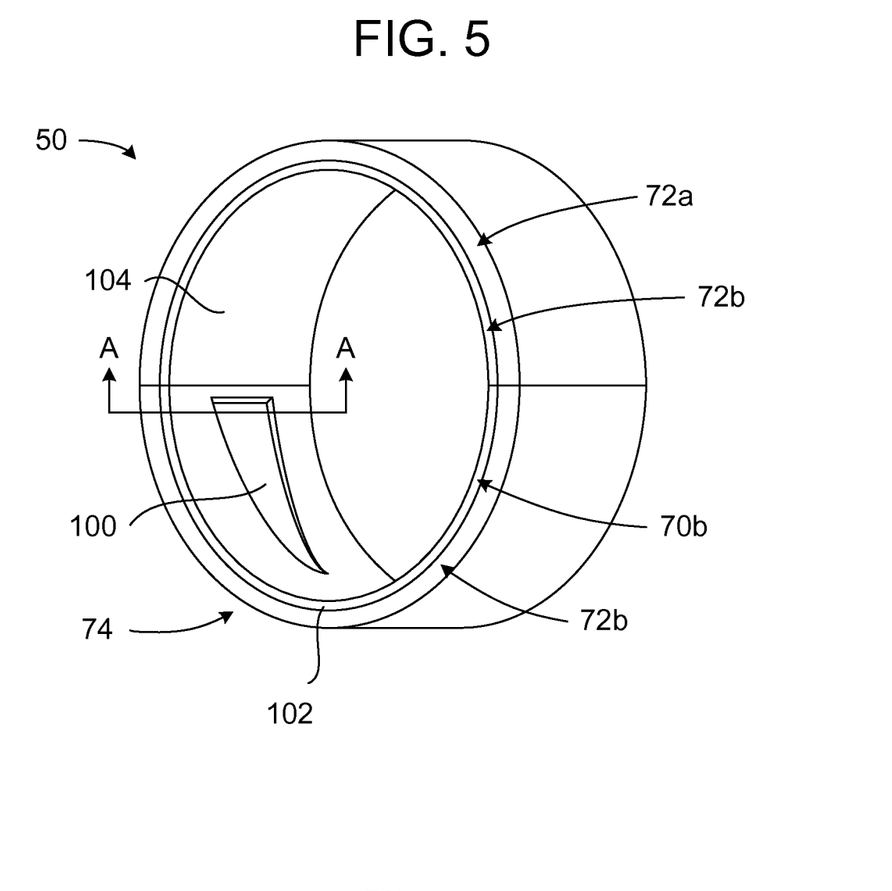
FIG. 5 is a perspective view of a main journal bearing according to the present disclosure.
Figure 6:
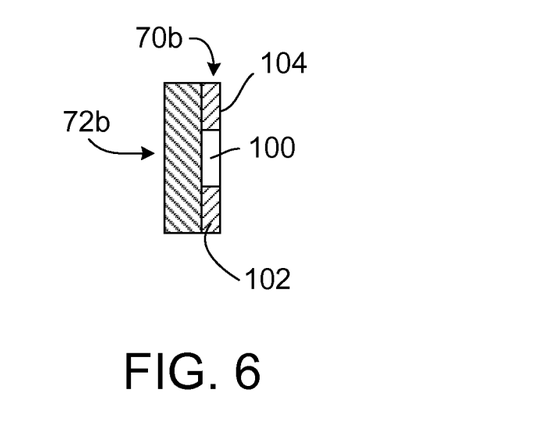
FIG. 6 is a cross sectional view of the journal bearing according to the present disclosure taken along line A-A of FIG. 5.

Referring now to FIGS. 5 and 6, there is shown a journal bearing 50 according to the present disclosure. As shown, the bearing inner lining 70b includes at least one aperture 100 formed in lining wall 102, with the lining wall 102 completely defining the aperture 100 and lining bearing surface 104.

Figure 7:
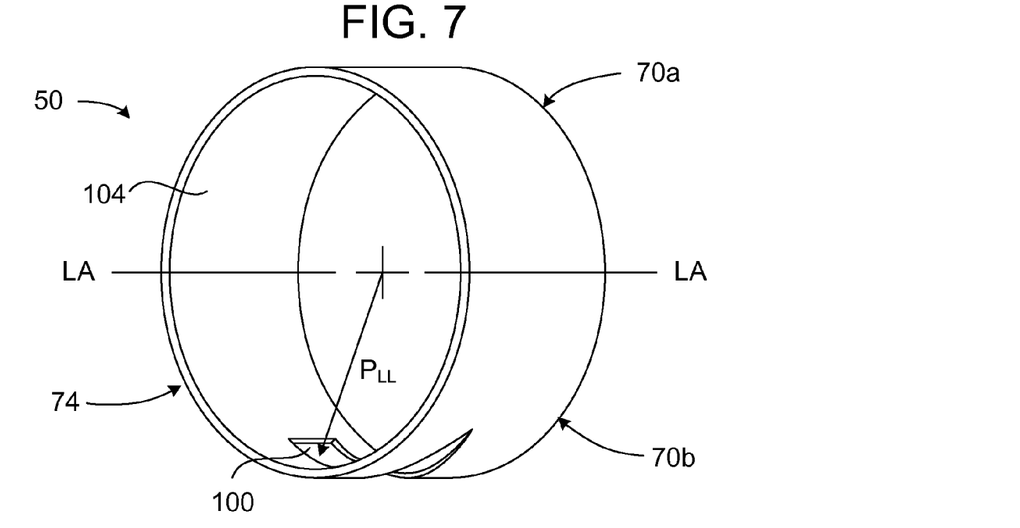
FIG. 7 is a perspective view of an orientation of the bearing inner lining of the main journal bearing of the present disclosure when the engine is under a low load condition.
Figure 8:
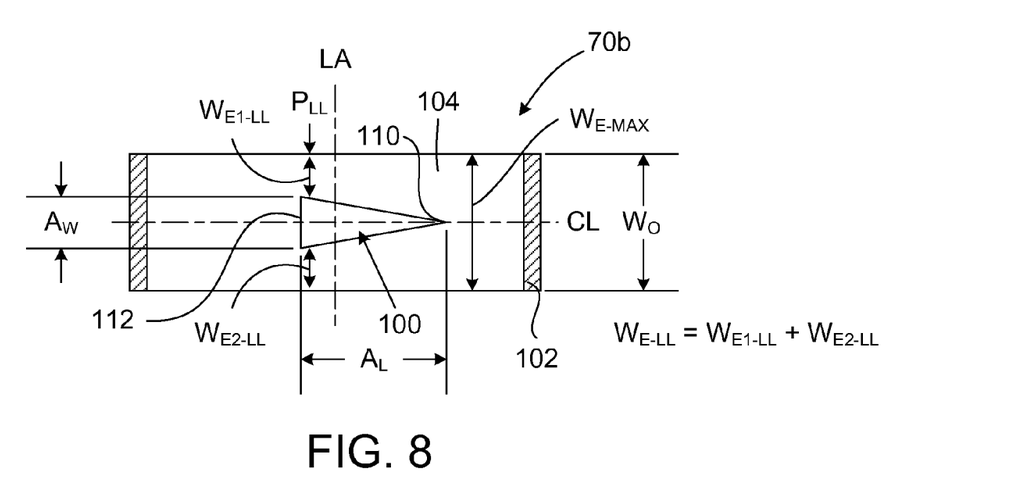
FIG. 8 is a cross-sectional top view of the bearing inner lining of the main journal bearing of FIG. 7 taken along a center thereof.

Referring now to FIGS. 7 and 8, journal bearing 50 is shown with bearing outer shell supports 72a, 72b removed for greater simplicity. As shown, due to the shape and arrangement of aperture 100, the lining 70b and the corresponding lining bearing surface 104 have an effective width $W_E$ (as measured parallel with the longitudinal axis of the bearing 50) which varies around a portion of the bearing circumference 74, particularly while an outer width $W_O$ of the lining 70b of bearing 50 remains constant around the bearing circumference 74.

The effective width $W_E$ of the lining 70b (and the corresponding lining bearing surface 104) may be understood to be that portion of the width of the lining 70b which operates to provide load-bearing capacity opposing the journal 46. Stated another way, the effective width $W_E$ of the lining 70b (and the corresponding lining bearing surface 104) does not include the width of aperture 100. As discussed in greater detail below, the effective width $W_E$ of the lining 70b (and the corresponding lining bearing surface 104) which interacts with the journal 46 varies to provide an relatively improved match of lining bearing surface area to the bearing load.

Aperture 100 is shown to have a width $A_W$ and a length $A_L$. The aperture width $A_W$ extends parallel to the longitudinal axis LA of the bearing 50. The aperture length $A_L$ extends along the circumference of the bearing 50 perpendicular to the longitudinal axis LA of the bearing 50, and is defined by opposing first and second ends 110, 112, respectively.

Aperture 100 is shown to a shape of a triangle, and more particularly the triangle shape is shown to be that of an isosceles triangle. However, while the triangular shape is shown to be that of an isosceles triangle, the shape may have other forms, such as that of an equilateral triangle, a trapezoid.

Due to the shape and arrangement of aperture 100, the aperture width $A_W$ varies continuously along the aperture length $A_L$ from one end 110 (i.e. the apex of the triangle) to the other end 112 (i.e. the base of the triangle). More particularly, the aperture width $A_W$ increases continuously along the aperture length $A_L$ from one end 110 to the other end 112, in a rotation direction of the journal 14 during operation of engine 10. Even more particularly, the aperture width $A_W$ increases continuously at a constant rate (due to the constant slope) along the aperture length $A_L$ from one end 110 to the other end 112. Moreover, when an imaginary plane (e.g. CL) bisects the bearing 60 into two equal halves, the aperture 100 is symmetrical on each side of the plane.

Now, as set forth above, in FIGS. 7 and 8, engine 10 is being operated under the low load condition of FIG. 2. Under a low load condition, the effective width $W_{E-LL}$ of the lining 70b (and the corresponding lining bearing surface 104) required for proper operation of engine 10 at a low load condition may be understood to be less than the maximum effective width $W_{E-MAX}$ of the lining 70b (and the corresponding lining bearing surface 104) required for proper operation of engine 10 at a high load condition.

For example, as shown by FIG. 8, the effective width $W_{E-LL}$ of the lining 70b (and the corresponding lining bearing surface 104) at high oil pressure location P for proper operation of engine 10 under low load, which may be designated as high oil pressure location $P_{LL}$, may be provided by the sum of lining width $W_{E1-LL}$ and lining width $W_{E2-LL}$ which is shown to be about 50% of the maximum effective width $W_{E-MAX}$ of the lining 70b (and the corresponding lining bearing surface 104).

Figure 9:
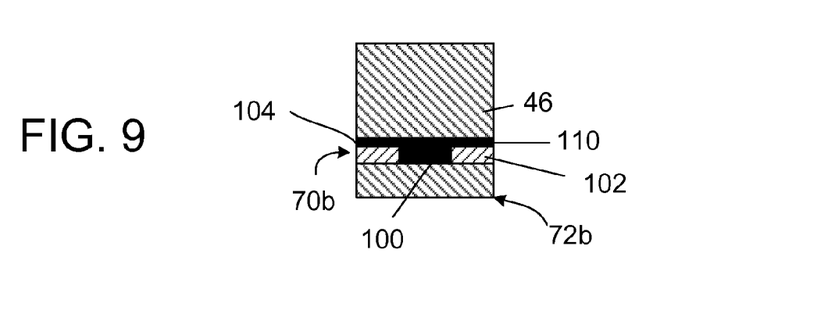
FIG. 9 is a cross sectional view taken along line 9-9 of FIG. 2.

Referring now to FIG. 9, which shows the thickness of the fluid (oil) film 110 at high pressure location P, it may be understood that, due to the presence of aperture 100, the thickness of the oil film 110 between the journal 46 and the bearing outer shell support 72b (within aperture) is greater than the thickness of the oil film 100 between the journal 46 and the adjacent lining 70b.

As set forth above, the viscous drag between two sliding surfaces may be generally stated by the equation Drag Force=A ϑ dV/dy, where the drag force (DF) is proportional to the load-bearing surface area (A), the lubricating fluid (oil) viscosity (ϑ), and the spatial rate of change of the velocity of the fluid (dV) and the clearance gap (dy).

As may be understood by the foregoing equation, the larger the clearance gap (dy) between the journal 45 and the bearing 50, the lower the resultant drag force (DF). Thus, due to the presence of aperture 100, and the resulting increase in the clearance gap (dy), the drag force (DF) associated with the journal 46 and bearing 50 is lower than the drag force (DF) without the existence of aperture 100. Stated another way, by reducing the effective width $W_{E-LL}$ of the lining 70b (and the corresponding lining bearing surface 104) at high oil pressure location $P_{LL}$ to be about 50% of the maximum effective width $W_{E-MAX}$ of the lining 70b (and the corresponding lining bearing surface 104), the drag force exhibited at high oil pressure location $P_{LL}$ may correspondingly be reduced.

Figure 10:
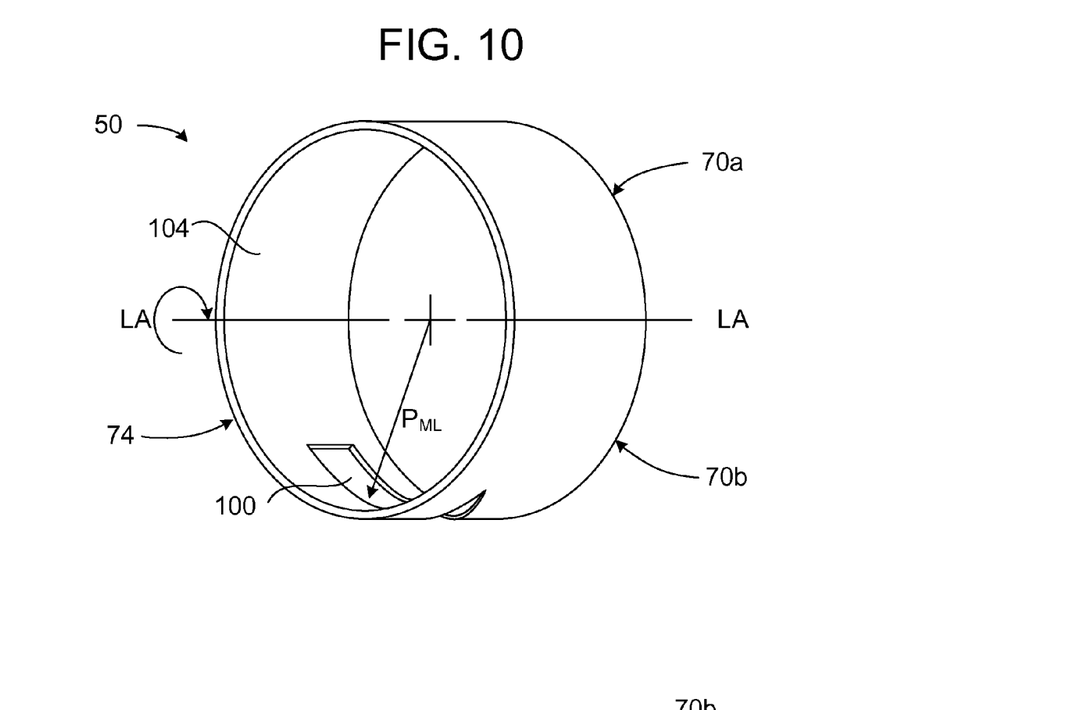
FIG. 10 is a perspective view of an orientation of the bearing inner lining of the main journal bearing of the present disclosure when the engine is under a medium load condition.
Figure 11:
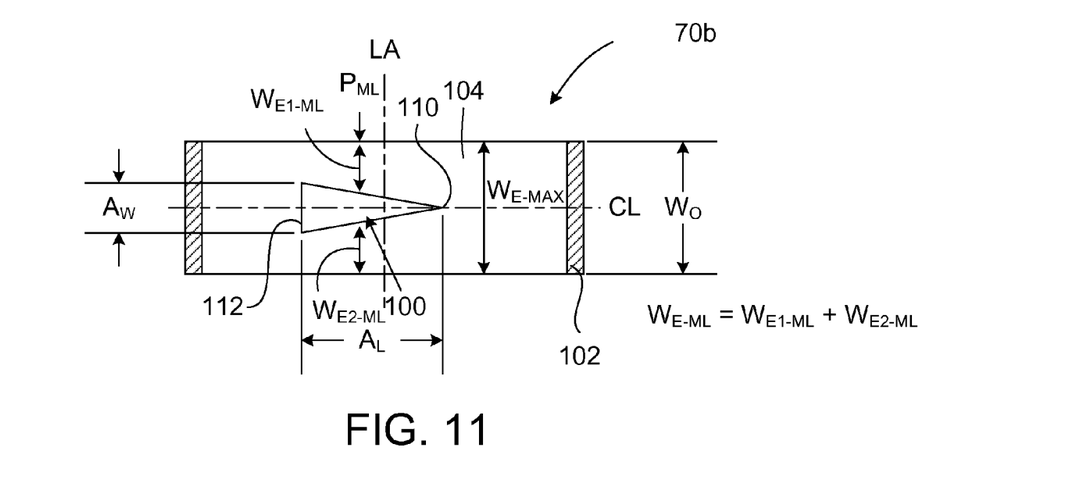
FIG. 11 is a cross-sectional top view of the bearing inner lining of the main journal bearing of FIG. 10 taken along a center thereof.

Now, in contrast to the orientation/positioning of linings 70a, 70b as shown in FIGS. 7-8 when engine 10 is being operated under the low load condition of FIG. 2, FIGS. 10-11 show an exemplary orientation or positioning of linings 70a, 70b when engine 10 is being operated under the medium load condition of FIG. 3. As such, the load being placed on journal bearing 50 has now increased above the load which was placed on the journal bearing 50 at a low load condition.

Similar to the low load condition, under a medium load condition, the effective width $W_{E-ML}$ of the lining 70b (and the corresponding lining bearing surface 104) required for proper operation of engine 10 at a medium load condition may be understood to be less than the maximum effective width $W_{E-MAX}$ of the lining 70b (and the corresponding lining bearing surface 104) required for proper operation of engine 10 at a high load condition. However, while being less than the maximum effective width $W_E$ MAX of the lining 70b (and the corresponding lining bearing surface 104) required for proper operation of engine 10 at a high load condition, the effective width $W_{E-ML}$ of the lining 70b (and the corresponding lining bearing surface 104) required for proper operation of engine 10 at a medium load condition must be increased beyond the effective width $W_{E-LL}$ of the lining 70b (and the corresponding lining bearing surface 104) required for proper operation of engine 10 at a low load condition.

In order to increase the effective width $W_{E-ML}$ of the lining 70b (and the corresponding lining bearing surface 104) at high oil pressure location P for proper operation of engine 10 under medium load, which may be designated as high oil pressure location $P_{ML}$, the journal bearing 50 may be rotated clockwise about 20-30 degrees. As such, the effective width $W_{E-ML}$ of the lining 70b (and the corresponding lining bearing surface 104) at high oil pressure location $P_{ML}$ is now provided by the sum of lining width $W_{E1-ML}$ and lining width $W_{E2-ML}$, which is shown to be about 75% of the maximum effective width $W_{E-MAX}$ of the lining 70b (and the corresponding lining bearing surface 104).

Again, as explained above, due to the presence of aperture 100, and the resulting increase in the clearance gap (dy), the drag force (DF) associated with the journal 46 and bearing 50 is lower than the drag force (DF) without the existence of aperture 100. Stated another way, by reducing the effective width $W_{E-ML}$ of the lining 70b (and the corresponding lining bearing surface 104) at high oil pressure location $P_{ML}$ to be about 75% of the maximum effective width $W_{E-MAX}$ of the lining 70b (and the corresponding lining bearing surface 104), the drag force exhibited at high oil pressure location $P_{ML}$ may correspondingly be reduced.

Figure 4:
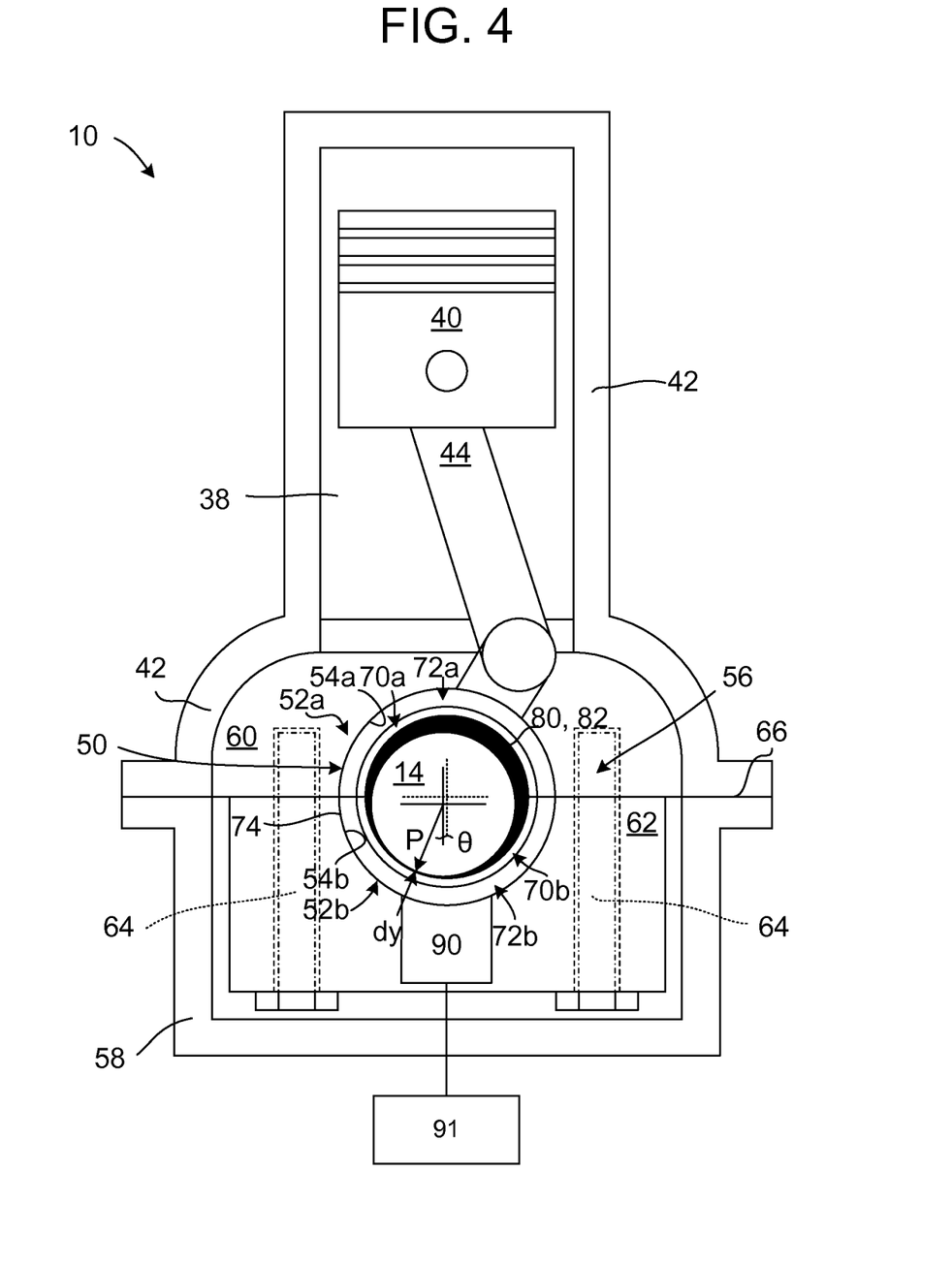
FIG. 4 shows a cross-sectional side view of the internal combustion engine of FIG. 2 with the piston in the combustion stroke, and the engine under a high load condition.
Figure 12:
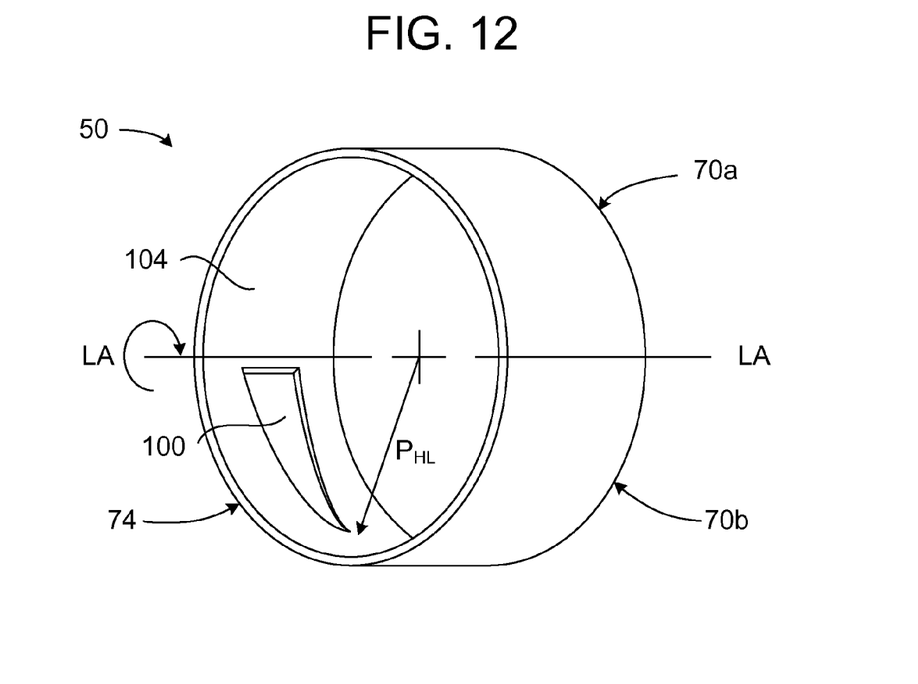
FIG. 12 is a perspective view of an orientation of the bearing inner lining of the main journal bearing of the present disclosure when the engine is under a high load condition.
Figure 13:
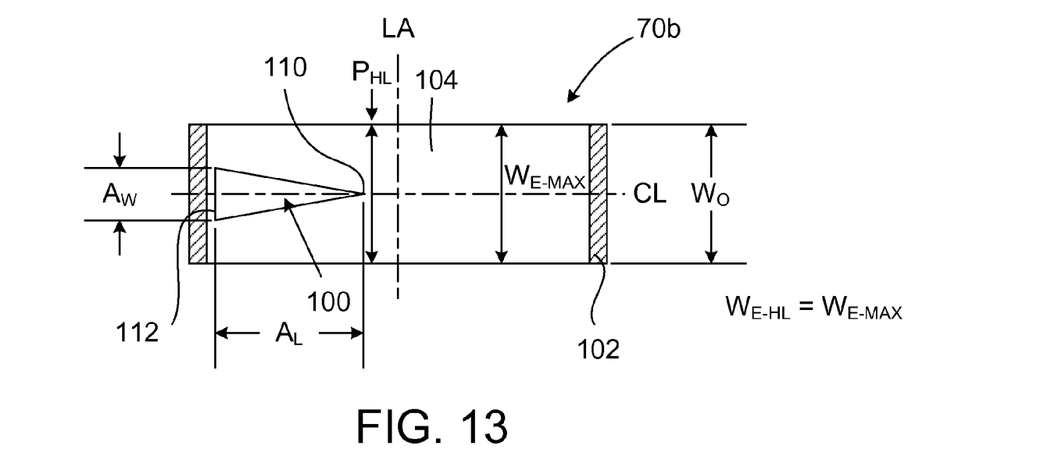
FIG. 13 is a cross-sectional top view of the bearing inner lining of the main journal bearing of FIG. 12 taken along a center thereof.

Now, in contrast to the orientation/positioning of linings 70a, 70b as shown in FIGS. 10-11 when engine 10 is being operated under the medium load condition of FIG. 3, FIGS. 12-13 show an exemplary orientation or positioning of linings 70a, 70b when engine 10 is being operated under the high load condition of FIG. 4. As such, the load being placed on journal bearing 50 has now increased above the load which was placed on the journal bearing 50 at a medium load condition, and the maximum effective width $W_{E-MAX}$ of the lining 70b (and the corresponding lining bearing surface 104) must now be relied upon for proper operation of the engine 10 at the high load condition.

In order to increase the effective width $W_{E-HL}$ of the lining 70b (and the corresponding lining bearing surface 104) at high oil pressure location P for proper operation of engine 10 under high load, which may be designated as high oil pressure location $P_{HL}$, the journal bearing 50 may be rotated clockwise another 20-30 degrees. As such, the effective width $W_{E-HL}$ of the lining 70b (and the corresponding lining bearing surface 104) at high oil pressure location $P_{HL}$ is now provided by the maximum effective width $W_{E-MAX}$ of the lining 70b (and the corresponding lining bearing surface 104).

Thereafter, as the load on the engine 10 decreases to a medium load, or to a low load, the journal bearing may be rotated in the opposite direction to again reduce the effective width $W_E$ of the lining 70b (and the corresponding lining bearing surface 104) required for proper operation of engine 10 and the corresponding drag force.

Thus, by rotating a journal bearing 50, including the aperture 100 as disclosed, within a support structure 74, a position of the load-bearing surface and load-bearing capacity of the journal bearing 50 may be changed at a particular location P, as well as a plurality of locations around a circumference of the journal bearing 50, particularly for a circumferential distance of at least 60 degrees around the journal bearing 50. Furthermore, the position of the load-bearing surface and load-bearing capacity of the journal bearing 50 may be changed at a particular location P, as well as a plurality of locations around a circumference of the journal bearing 50 as a load on the engine 10 changes and/or the journal 14 moves closer to the journal bearing 50. More particularly, rotating the journal bearing 50 within the support structure 74 as a load on the engine 10 increases and the journal 14 moves closer to a location P of the journal bearing 50 may be performed such that the load-bearing capacity of the journal bearing 50 increases at the location P where the journal 14 moves closer to the journal bearing 50 to inhibit contact of journal bearing 50 by the journal 14.

Moreover, rotating the journal bearing 50 within the support structure 74 to change a position of the load-bearing capacity of the journal bearing 50 relative to the journal 14 may further comprise rotating the journal bearing 50 within the support structure 74 in a first direction as a load on the engine increases and rotating the journal bearing 50 within the support structure 74 in a second direction oppose the first direction as the load on the engine decreases.

Rotating the journal bearing 50 in the first direction may take place during the combustion (power) stroke of the engine 10, while rotating journal bearing 50 in the second direction opposite the first direction may take place during the exhaust stroke, in which case the journal bearing 50 may not be rotated during the intake or compression strokes. As such, rotating the journal bearing 50 within the support structure 74 to change a position of the load-bearing capacity of the journal bearing 50 relative to the journal 14 may further comprise rotating the journal bearing 50 within the support structure 74 only during a portion of a four-stroke cycle of the engine 10.

While a preferred embodiment of the present invention has been described, it should be understood that various changes, adaptations and modifications can be made therein without departing from the spirit of the invention and the scope of the appended claims. The scope of the invention should, therefore, be determined not with reference to the above description, but instead should be determined with reference to the appended claims along with their full scope of equivalents. Furthermore, it should be understood that the appended claims do not necessarily comprise the broadest scope of the invention which the Applicant is entitled to claim, or the only manner(s) in which the invention may be claimed, or that all recited features are necessary.

What is claimed is:

1. A method of adjusting a load-bearing capacity of a hydrodynamic plain journal bearing for a journal, comprising:
providing a hydrodynamic plain journal bearing having a circumference, wherein a load-bearing capacity of the journal bearing varies around the bearing circumference;
providing the hydrodynamic plain journal bearing in a journal bearing support structure, wherein the support structure supports the hydrodynamic plain journal bearing around the journal; and
rotating the hydrodynamic plain journal bearing within the support structure to change a position of the load-bearing capacity of the journal bearing relative to the journal.

2. The method of claim 1, wherein:
the hydrodynamic plain journal bearing comprises a bearing inner lining, wherein the bearing inner lining has an effective width which varies around a portion of the bearing circumference such that the load-bearing capacity of the journal bearing varies around the bearing circumference.

3. The method of claim 2, wherein:
the bearing inner lining includes an aperture shaped and arranged such that the effective width of the bearing inner lining varies around the portion of the bearing circumference.

4. The method of claim 3, wherein:
the aperture has a width and a length, wherein the length is defined by opposing ends of the aperture;
the length of the aperture extends around a circumference of the bearing inner lining perpendicular to a longitudinal axis of the bearing; and
the width of the aperture varies continuously along the length of the aperture from one end to the other end.

5. The method of claim 3, wherein:
the aperture has a width and a length, wherein the length is defined by opposing ends of the aperture;
the length of the aperture extends around a circumference of the bearing inner lining perpendicular to a longitudinal axis of the bearing; and
the width of the aperture increases continuously along the length of the aperture from one end to the other end.

6. The method of claim 3, wherein:
the journal bearing and journal are in an internal combustion engine or an electric motor; and
the width of the aperture increases in a rotation direction of the journal during operation of the engine or the electric motor.

7. The method of claim 3, wherein:
the aperture has a width and a length, wherein the length is defined by opposing ends of the aperture;
the length of the aperture extends around a circumference of the bearing inner lining perpendicular to a longitudinal axis of the bearing; and
the width of the aperture increases continuously at a constant rate along the length of the aperture from one end to the other end.

8. The method of claim 3, wherein:
the aperture has a shape of a triangle.

9. The method of claim 8, wherein:
the triangle has the shape of an isosceles triangle.

10. The method of claim 1 wherein:
the journal bearing is separable into two halves.

11. The method of claim 2, wherein:
the journal bearing inner lining has an outer width which remains constant around the bearing circumference.

12. The method of claim 1, wherein:
the journal bearing and journal are in an internal combustion engine or an electric motor; and
rotating the hydrodynamic plain journal bearing within the support structure to change a position of the load-bearing capacity of the journal bearing relative to the journal further comprises rotating the hydrodynamic plain journal bearing within the support structure as a load on the engine or motor changes.

13. The method of claim 1, wherein:
the journal bearing and journal are in an internal combustion engine or an electric motor; and
rotating the hydrodynamic plain journal bearing within the support structure to change a position of the load-bearing capacity of the journal bearing relative to the journal further comprises rotating the hydrodynamic plain journal bearing within the support structure as a load on the engine or motor changes and the journal moves closer to the journal bearing.

14. The method of claim 1, wherein:
the journal bearing and journal are in an internal combustion engine or an electric motor; and rotating the hydrodynamic plain journal bearing within the support structure to change a position of the load-bearing capacity of the journal bearing relative to the journal further comprises rotating the hydrodynamic plain journal bearing within the support structure in a first direction as a load on the engine or motor increases and rotating the hydrodynamic plain journal bearing within the support structure in a second direction oppose the first direction as the load on the engine or motor decreases.

15. The method of claim 1, wherein:

the journal bearing and journal are in an internal combustion engine or an electric motor; and rotating the hydrodynamic plain journal bearing within the support structure to change a position of the load-bearing capacity of the journal bearing relative to the journal further comprises rotating the hydrodynamic plain journal bearing within the support structure as a load on the engine or motor increases and the journal moves closer to a location of the journal bearing such that the load-bearing capacity of the journal bearing increases at the location where the journal moves closer to the journal bearing.

16. The method of claim 1, wherein:

the journal bearing and journal are in an internal combustion engine; and rotating the hydrodynamic plain journal bearing within the support structure to change a position of the load-bearing capacity of the journal bearing relative to the journal further comprises rotating the hydrodynamic plain journal bearing within the support structure during a power stroke and/or exhaust stroke of the engine.

17. The method of claim 1, wherein:

the journal bearing and journal are in an internal combustion engine having a four-stroke cycle; and rotating the hydrodynamic plain journal bearing within the support structure to change a position of the load-bearing capacity of the journal bearing relative to the journal further comprises rotating the hydrodynamic plain journal bearing within the support structure only during a portion of the four-stroke cycle.

18. The method of claim 1, wherein:

rotating the hydrodynamic plain journal bearing is performed by an actuator.

19. The method of claim 18, wherein:

the actuator is mounted to the journal bearing support structure.

20. The method of claim 19 wherein:

an engine controller is programmed to control the actuator.

* * * * *